(12) United States Patent
Faitelson et al.

(10) Patent No.: US 11,604,791 B2
(45) Date of Patent: *Mar. 14, 2023

(54) AUTOMATIC RESOURCE OWNERSHIP ASSIGNMENT SYSTEMS AND METHODS

(71) Applicant: VARONIS SYSTEMS, INC., New York, NY (US)

(72) Inventors: Yakov Faitelson, Elkana (IL); Ohad Korkus, Herzeliya (IL); Ophir Kretzer-Katzir, Reut (IL)

(73) Assignee: VARONIS SYSTEMS, INC.

( * ) Notice: Subject to any disclaimer, the term of this patent is extended or adjusted under 35 U.S.C. 154(b) by 493 days.

This patent is subject to a terminal disclaimer.

(21) Appl. No.: 14/456,373

(22) Filed: Aug. 11, 2014

(65) Prior Publication Data

US 2015/0186392 A1     Jul. 2, 2015

Related U.S. Application Data

(63) Continuation of application No. 13/014,762, filed on Jan. 27, 2011, now Pat. No. 8,805,884.

(30) Foreign Application Priority Data

Jan. 27, 2010  (IL) .................... PCT/IL2010/000069

(51) Int. Cl.
*G06F 16/00* (2019.01)
*G06F 16/245* (2019.01)
(Continued)

(52) U.S. Cl.
CPC ............ *G06F 16/245* (2019.01); *G06F 16/13* (2019.01); *G06F 21/6218* (2013.01);
(Continued)

(58) Field of Classification Search
CPC .......... G06F 17/3089; G06F 17/30011; G06F 17/3007; G06F 17/30082
(Continued)

(56) References Cited

U.S. PATENT DOCUMENTS 5,465,387 A   11/1995  Mukherjee
5,729,734 A    3/1998  Parker et al.
(Continued)

FOREIGN PATENT DOCUMENTS

CN    1588889 A    3/2005
EP    1248178 B1  10/2002
(Continued)

OTHER PUBLICATIONS

Sahadeb DE, et al; "Secure Access Control in a Multi-user Geodatabase" available on the internet at the URL http://www10.giscafe.com. 2005; 10 pages.
(Continued)

*Primary Examiner* — Monica M Pyo

(57) ABSTRACT

An automatic resource ownership assignment system, the system including resource ownership indicators definition functionality operative to allow an operator of the system to define resource ownership indicators, automatic resource ownership recommendation functionality operative to provide, to at least one user of the system, a recommendation to assign ownership of at least one resource to a potential owner, based on the resource ownership indicators, and automatic resource ownership assignment functionality which, responsive to predetermined at least partial approval of the at least one recommendation by the at least one user and approval of said at least one recommendation by the potential owner, is operative to automatically assign ownership of the at least one resource to the potential owner.

13 Claims, 14 Drawing Sheets

(51) Int. Cl.
   *G06F 16/13* (2019.01)
   *G06F 21/62* (2013.01)
   *H04L 9/40* (2022.01)
(52) U.S. Cl.
   CPC ...... *H04L 63/10* (2013.01); *G06F 2221/2101* (2013.01); *G06F 2221/2141* (2013.01)
(58) Field of Classification Search
   USPC .................................................. 707/781–785
   See application file for complete search history.

(56) References Cited

U.S. PATENT DOCUMENTS

| | | | |
|---|---|---|---|
| 5,889,952 | A | 3/1999 | Hunnicutt et al. |
| 5,899,991 | A | 5/1999 | Karch |
| 6,308,173 | B1 | 10/2001 | Glasser et al. |
| 6,338,082 | B1 | 1/2002 | Schneider |
| 6,393,468 | B1 | 5/2002 | McGee |
| 6,772,350 | B1 | 8/2004 | Belani et al. |
| 6,928,439 | B2 | 8/2005 | Satoh |
| 7,017,183 | B1 | 3/2006 | Frey et al. |
| 7,031,984 | B2 | 4/2006 | Kawamura et al. |
| 7,068,592 | B1 | 6/2006 | Duvaut et al. |
| 7,305,562 | B1 | 12/2007 | Bianco et al. |
| 7,403,925 | B2 | 7/2008 | Schlesinger et al. |
| 7,421,740 | B2 | 9/2008 | Fey et al. |
| 7,555,482 | B2 | 6/2009 | Korkus |
| 7,606,801 | B2 | 10/2009 | Faitelson |
| 7,716,240 | B2 | 5/2010 | Lim |
| 7,743,420 | B2 | 6/2010 | Shulman et al. |
| 8,533,787 | B2 | 9/2013 | Faitelson et al. |
| 8,805,884 | B2 | 8/2014 | Faitelson et al. |
| 8,875,246 | B2 | 10/2014 | Faitelson et al. |
| 8,875,248 | B2 | 10/2014 | Faitelson et al. |
| 2003/0048301 | A1 | 3/2003 | Menninger |
| 2003/0051026 | A1 | 3/2003 | Carter et al. |
| 2003/0231207 | A1 | 12/2003 | Huang |
| 2004/0030915 | A1 | 2/2004 | Sameshima et al. |
| 2004/0186809 | A1 | 9/2004 | Schlesinger et al. |
| 2004/0249847 | A1 | 12/2004 | Wang et al. |
| 2004/0254919 | A1 | 12/2004 | Giuseppini |
| 2005/0086268 | A1* | 4/2005 | Rogers .......................... 707/200 |
| 2005/0086529 | A1 | 4/2005 | Buchsbaum |
| 2005/0108206 | A1 | 5/2005 | Lam et al. |
| 2005/0120054 | A1 | 6/2005 | Shulman |
| 2005/0203881 | A1 | 9/2005 | Sakamoto et al. |
| 2005/0246762 | A1 | 11/2005 | Girouard et al. |
| 2005/0278334 | A1 | 12/2005 | Fey et al. |
| 2006/0064313 | A1 | 3/2006 | Steinbarth et al. |
| 2006/0184459 | A1 | 8/2006 | Parida |
| 2006/0184530 | A1 | 8/2006 | Song et al. |
| 2006/0277184 | A1 | 12/2006 | Faitelson et al. |
| 2007/0027872 | A1 | 2/2007 | Johnson et al. |
| 2007/0061487 | A1 | 3/2007 | Moore et al. |
| 2007/0073698 | A1 | 3/2007 | Kanayama et al. |
| 2007/0094265 | A1 | 4/2007 | Korkus |
| 2007/0101387 | A1 | 5/2007 | Hua et al. |
| 2007/0112743 | A1 | 5/2007 | Giampaolo et al. |
| 2007/0143859 | A1* | 6/2007 | Ogi et al. ........................ 726/27 |
| 2007/0156659 | A1 | 7/2007 | Lim |
| 2007/0156693 | A1 | 7/2007 | Soin et al. |
| 2007/0203872 | A1 | 8/2007 | Flinn et al. |
| 2007/0244899 | A1* | 10/2007 | Faitelson et al. ................. 707/9 |
| 2007/0266006 | A1 | 11/2007 | Buss |
| 2007/0282855 | A1 | 12/2007 | Chen et al. |
| 2008/0034402 | A1 | 2/2008 | Botz et al. |
| 2008/0162707 | A1 | 7/2008 | Beck et al. |
| 2008/0172720 | A1 | 7/2008 | Botz et al. |
| 2008/0270462 | A1 | 10/2008 | Thomsen |
| 2008/0271157 | A1 | 10/2008 | Faitelson et al. |
| 2009/0100058 | A1 | 4/2009 | Faitelson et al. |
| 2009/0119298 | A1 | 5/2009 | Faitelson et al. |
| 2009/0150981 | A1 | 6/2009 | Amies et al. |
| 2009/0198892 | A1 | 8/2009 | Alvarez et al. |
| 2009/0249446 | A1 | 10/2009 | Jenkins et al. |
| 2009/0265780 | A1 | 10/2009 | Korkus et al. |
| 2009/0320088 | A1 | 12/2009 | Gill et al. |
| 2010/0037324 | A1 | 2/2010 | Grant et al. |
| 2010/0070881 | A1 | 3/2010 | Hanson et al. |
| 2010/0262625 | A1 | 10/2010 | Pittenger |
| 2011/0010758 | A1 | 1/2011 | Faitelson et al. |
| 2011/0060916 | A1 | 3/2011 | Faitelson et al. |
| 2011/0061111 | A1 | 3/2011 | Faitelson et al. |
| 2011/0184989 | A1 | 7/2011 | Faitelson et al. |
| 2012/0221550 | A1 | 8/2012 | Korkus et al. |
| 2012/0291100 | A1 | 11/2012 | Faitelson et al. |
| 2013/0017314 | A1 | 1/2013 | Yang et al. |
| 2013/0117315 | A1 | 5/2013 | Faitelson et al. |
| 2014/0006453 | A1 | 1/2014 | Faitelson et al. |
| 2015/0012572 | A1 | 1/2015 | Faitelson et al. |
| 2015/0012573 | A1 | 1/2015 | Faitelson et al. |

FOREIGN PATENT DOCUMENTS

| | | |
|---|---|---|
| JP | 2005-267237 A | 9/2005 |
| JP | 2010-287171 A | 12/2010 |
| WO | 2011/030324 A1 | 3/2011 |

OTHER PUBLICATIONS

Varonis; "Entitlement Reviews: A Practitioner's Guide", 2007, 16 pages.
Findutils-GNU Project-Free Software Foundation (FSF), 3 pages, Nov. 2006.
S.R. Kleiman; "Vnodes: An Architecture for Multiple File System Types in Sun UNIX", USENIX Association: Summer Conference Proceedings, Atlanta 1986, 10 pages.
Sara C. Madeira, et al; "Biclustering Algorithms for Biological Data Analysis: A Survey", IEEE Transactions on Computational Biology and Bioinformatics, vol. 1, No. 1, Jan.-Mar. 2004, 22 pages; http://www.cs.princeton.edu/courses/archive/spr05/cos598E/bib/bicluster.pdf.
Sara C. Madeira; Clustering, Fuzzy Clustering and Biclustering: An Overview; pp. 31-53, Jun. 27, 2003.
Edgar Weippl, et al; "Content-based Management of Document Access Control" 14th International Conference on Applications of Prolog (INAP), 2001, 9 pages.
Alex Woodie; "Varonis Prevents Unauthorized Access to Unstructured Data", Four Hundred Stuff, vol. 7, No. 29; Jul. 31, 2007; 4 pages.
Genunix; "Writing Filesystems—VFS and Vnode Interfaces", Oct. 2007, 5 pages.
Varonis; The Business Case for Data Governance; dated Mar. 27, 2007; 8 pages.
DatAdvantage User Guide by Varonis, Version 1.0, Aug. 30, 2005, 71 pages.
DatAdvantage User Guide by Varonis, Version 2.0, Aug. 24, 2006, 118 pages.
DatAdvantage User Guide by Varonis, Version 2.5, Nov. 27, 2006, 124 pages.
DatAdvantage User Guide by Varonis, Version 2.6, Dec. 15, 2006, 127 pages.
DatAdvantage User Guide by Varonis, Version 2.7, Feb. 6, 2007, 131 pages.
DatAdvantage User Guide by Varonis, Version 3.0, Jun. 20, 2007, 153 pages.
A List of Database Tables in DatAdvantage 2.7, Feb. 6, 2007 1 page by Varonis.
A List of Database Tables in DatAdvantage 3.0, Jun. 20, 2007 1 page by Varonis.
Varonis; "Accelerating Audits with Automation: Understanding Who's Accessing Your Unstructured Data" Oct. 8, 2007; 7 pages.
German Office Action dated Sep. 14, 2012 which issued during the prosecution of German Patent Application No. 11 2006 001 378.5.
International Preliminary Report on Patentability dated Jul. 30, 2013; PCT/IL2011/000902.
International Preliminary Report on Patentability dated Jul. 30, 2013; PCT/IL2011/000903.

(56) References Cited

OTHER PUBLICATIONS

International Search Report and Written Opinion dated May 23, 2011; PCT/IL11/00065.
International Search Report and Written Opinion dated May 20, 2010; PCT/IL10/00069.
International Search Report and Written Opinion dated May 24, 2011; PCT/IL11/00077.
International Search Report and Written Opinion dated Nov. 15, 2011; PCT/IL11/00408.
International Search Report and Written Opinion dated Apr. 13, 2012; PCT/IL11/00902.
U.S. Appl. No. 60/688,486, filed Jun. 7, 2005.
U.S. Appl. No. 61/240,726, filed Sep. 9, 2009.
USPTO NFOA mailed Feb. 12, 2008 in connection with U.S. Appl. No. 11/258,256.
USPTO FOA dated Aug. 1, 2008 in connection with U.S. Appl. No. 11/258,256.
USPTO NFOA dated Oct. 31, 2008 in connection with U.S. Appl. No. 11/635,736.
USPTO NFOA dated Dec. 14, 2010 in connection with U.S. Appl. No. 11/786,522.
USPTO NFOA dated Jul. 9, 2010 in connection with U.S. Appl. No. 11/789,884.
USPTO FOA dated Dec. 14, 2010 in connection with U.S. Appl. No. 11/789,884.
USPTO NFOA dated Sep. 16, 2010 in connection with U.S. Appl. No. 11/871,028.
USPTO FOA dated Apr. 28, 2011 in connection with U.S. Appl. No. 11/871,028.
USPTO NFOA dated Sep. 14, 2012 in connection with U.S. Appl. No. 12/861,967.
USPTO NFOA dated Jul. 11, 2012 in connection with U.S. Appl. No. 13/014,762.
USPTO FOA dated Feb. 14, 2013 in connection with U.S. Appl. No. 13/014,762.
USPTO NOA dated Aug. 30, 2013 in connection with U.S. Appl. No. 13/014,762.
USPTO NFOA dated Dec. 16, 2013 in connection with U.S. Appl. No. 13/014,762.
USPTO NOA dated Mar. 28, 2014 in connection with U.S. Appl. No. 13/014,762.
USPTO RR dated Nov. 21, 2012 in connection with U.S. Appl. No. 13/106,023.
USPTO NFOA dated Mar. 1, 2013 in connection with U.S. Appl. No. 13/106,023.
USPTO NOA dated May 15, 2013 in connection with U.S. Appl. No. 13/106,023.
USPTO FOA dated Mar. 25, 2013 in connection with U.S. Appl. No. 13/303,826.
USPTO FOA dated Sep. 6, 2013 in connection with U.S. Appl. No. 13/378,115.
USPTO NFOA dated May 8, 2014 in connection with U.S. Appl. No. 13/724,028.
USPTO NOA dated Aug. 19, 2014 in connection with U.S. Appl. No. 13/724,028.
USPTO NFOA dated Feb. 6, 2015 in connection with U.S. Appl. No. 13/724,121.
USPTO NOA dated May 22, 2015 in connection with U.S. Appl. No. 13/724,121.
USPTO NFOA dated May 14, 2014 in connection with U.S. Appl. No. 14/018,835.
USPTO NOA dated Aug. 21, 2014 in connection with U.S. Appl. No. 14/018,835.
USPTO NFOA dated Jun. 4, 2015 in connection with U.S. Appl. No. 14/498,189.
USPTO NFOA dated Jun. 5, 2015 in connection with U.S. Appl. No. 14/498,373.

\* cited by examiner

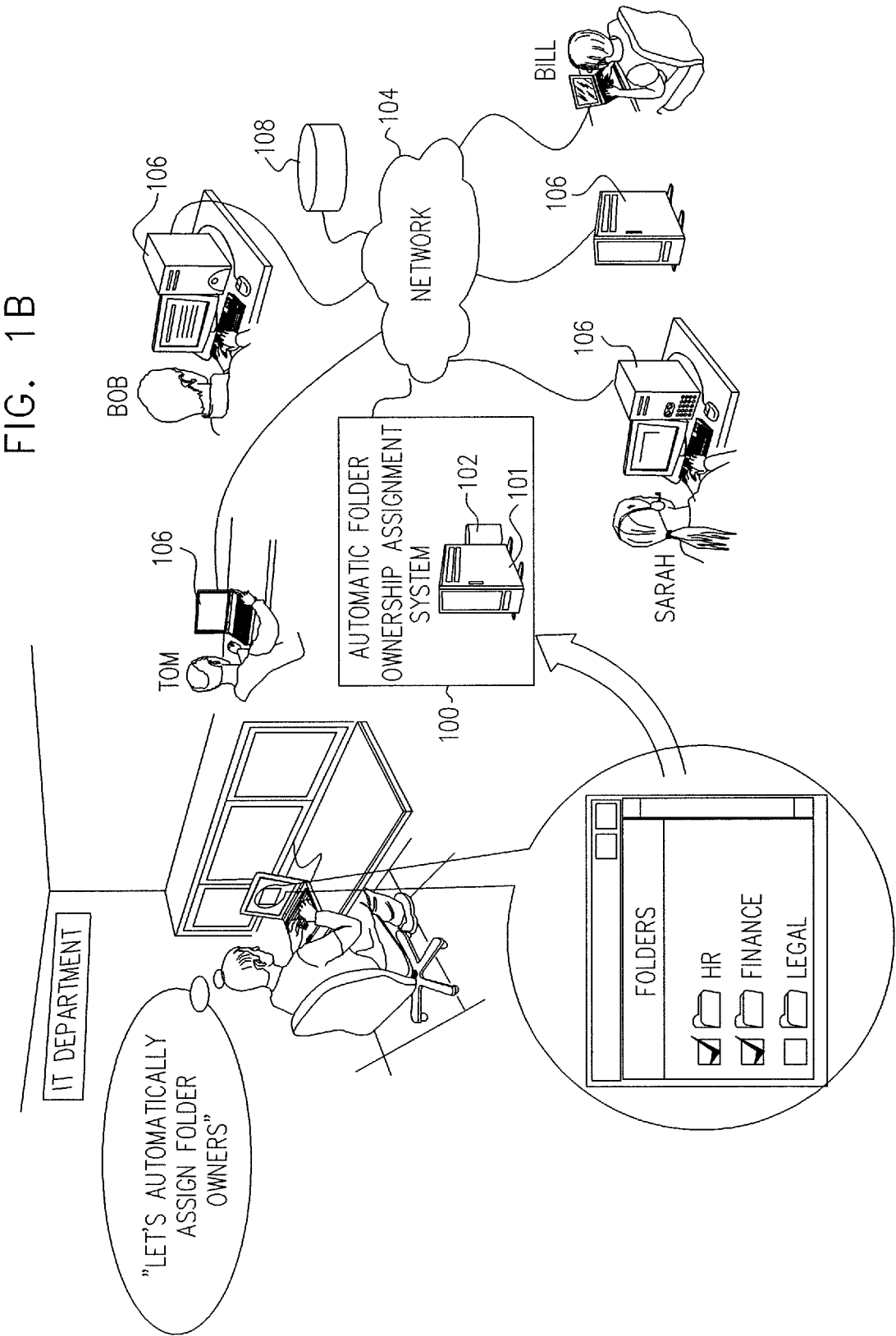

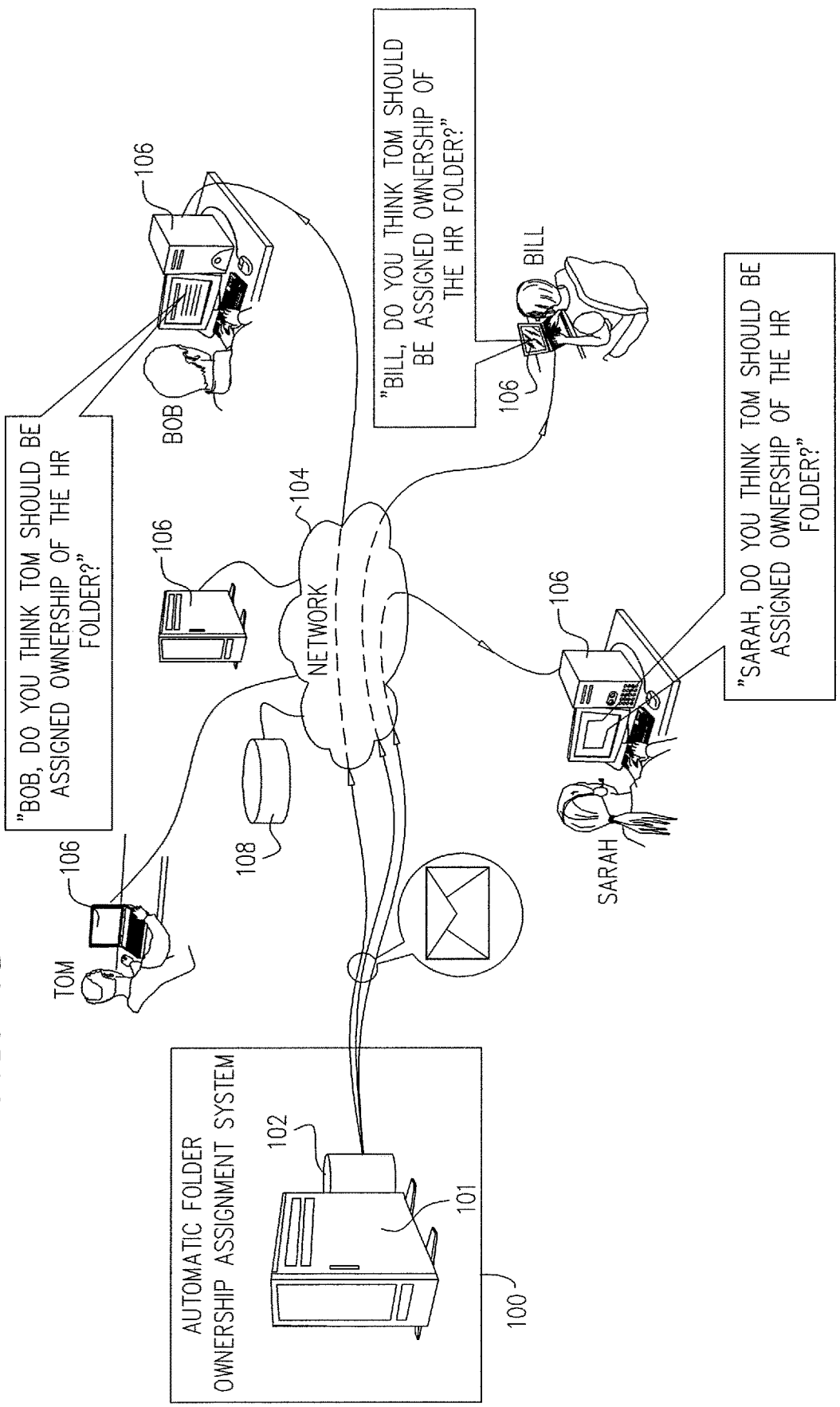

FIG. 1G

AUTOMATIC FOLDER OWNERSHIP ASSIGNMENT SYSTEM

FOLDER PERMISSIONS TABLE — 110

| FOLDER | USER | PERMISSIONS | | | |
|---|---|---|---|---|---|
| | | READ | WRITE | CREATE | DELETE |
| HR | TOM | ✓ | ✓ | | ✓ |
| | BOB | ✓ | ✓ | | |
| | BILL | ✓ | ✓ | ✓ | |
| | SARAH | ✓ | | | |
| FINANCE | TOM | ✓ | ✓ | | |
| | BOB | ✓ | ✓ | ✓ | ✓ |
| | BILL | ✓ | | | |
| | SARAH | | | | |

FOLDER OWNERSHIP TABLE — 114

| FOLDER | OWNER |
|---|---|
| HR | Tom |
| FINANCE | Bob |

100
102
101

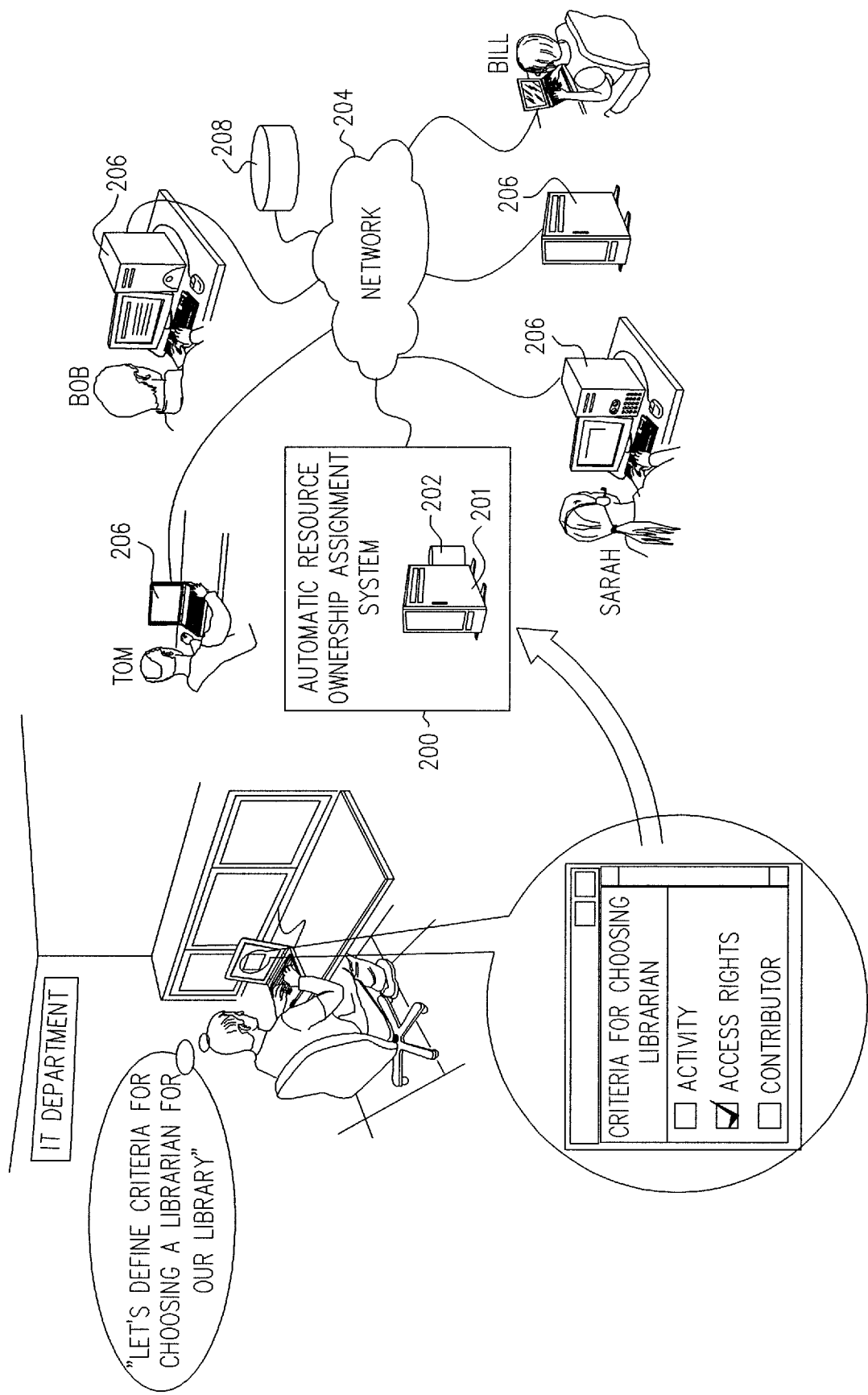

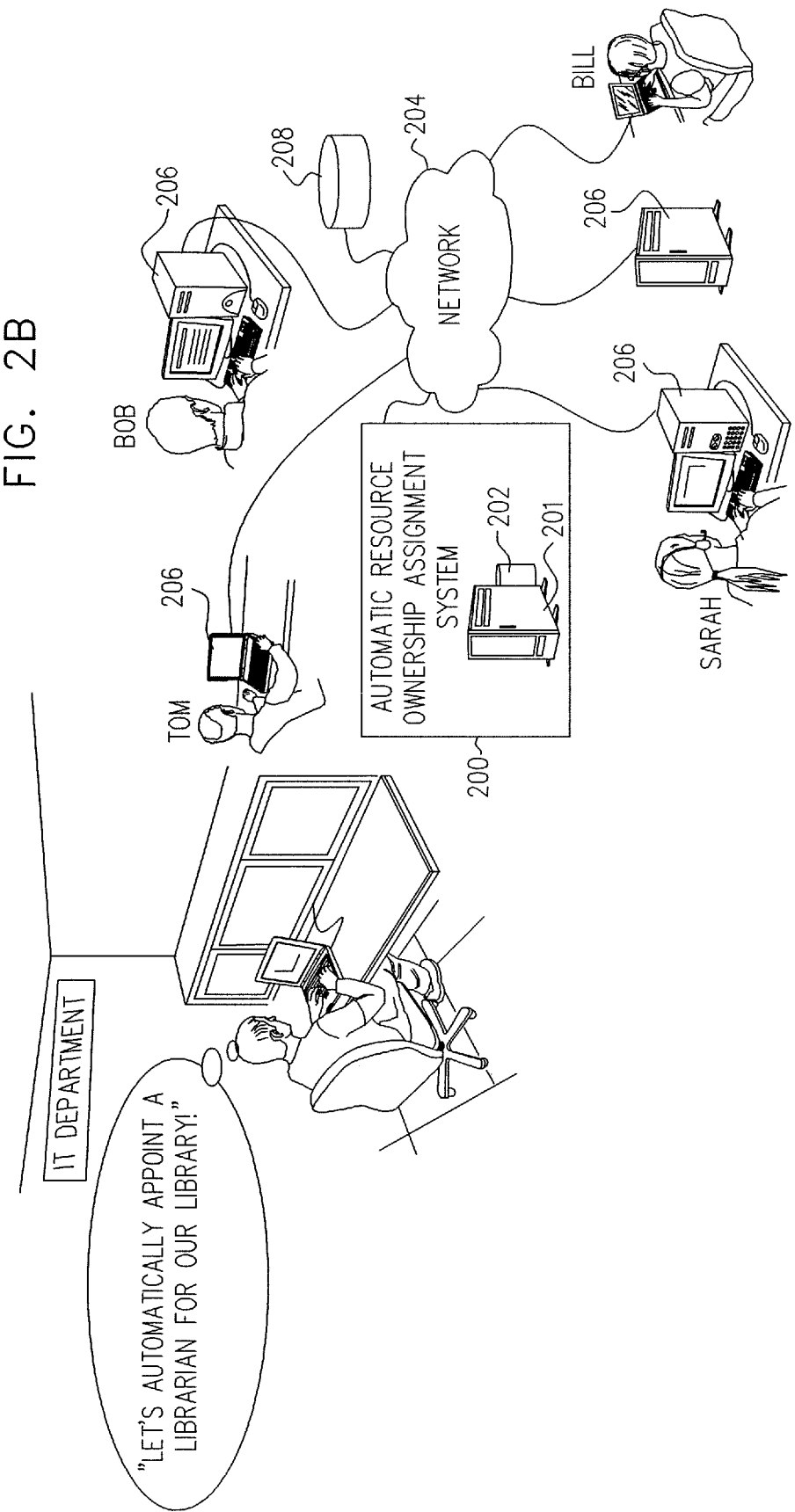

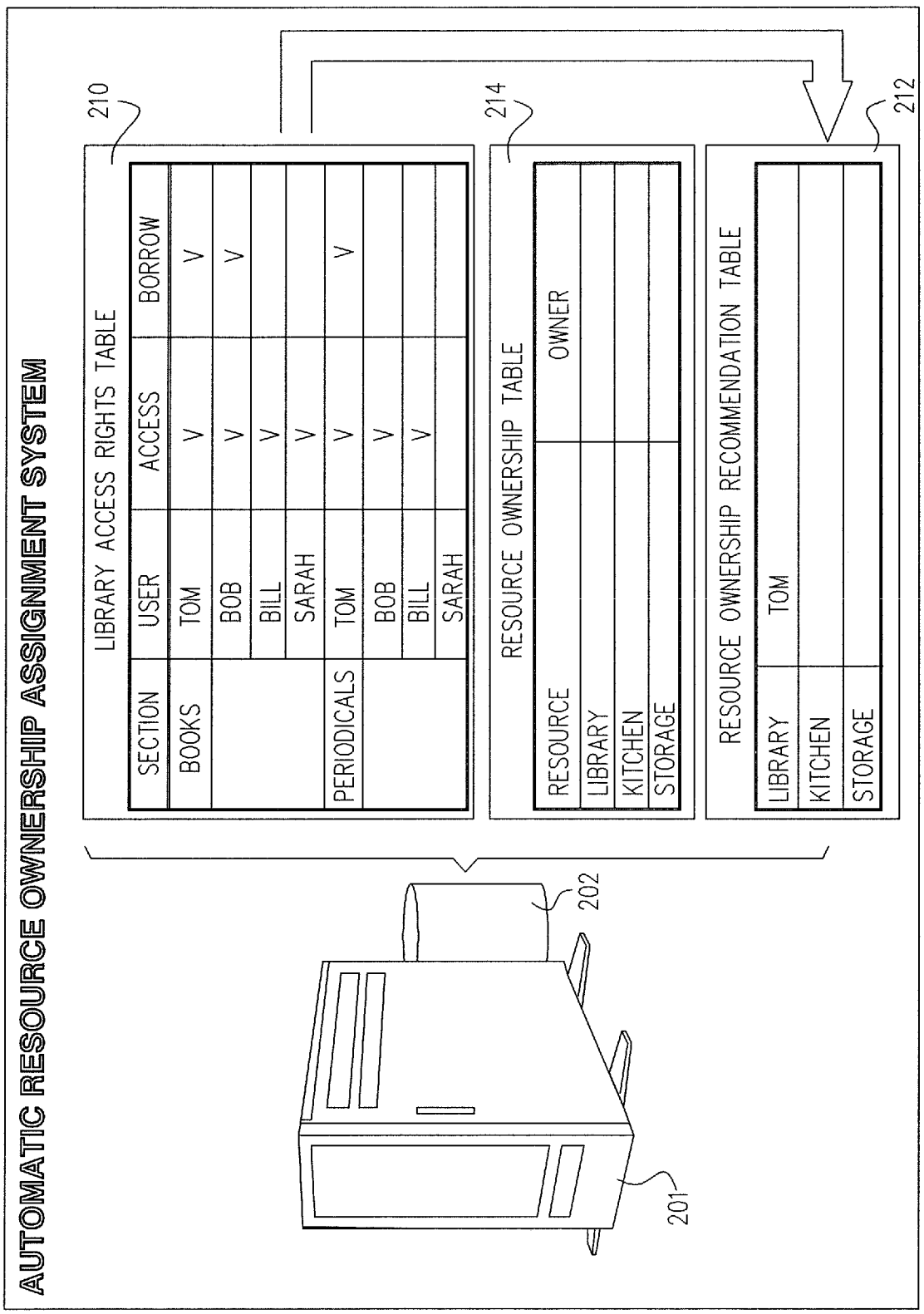

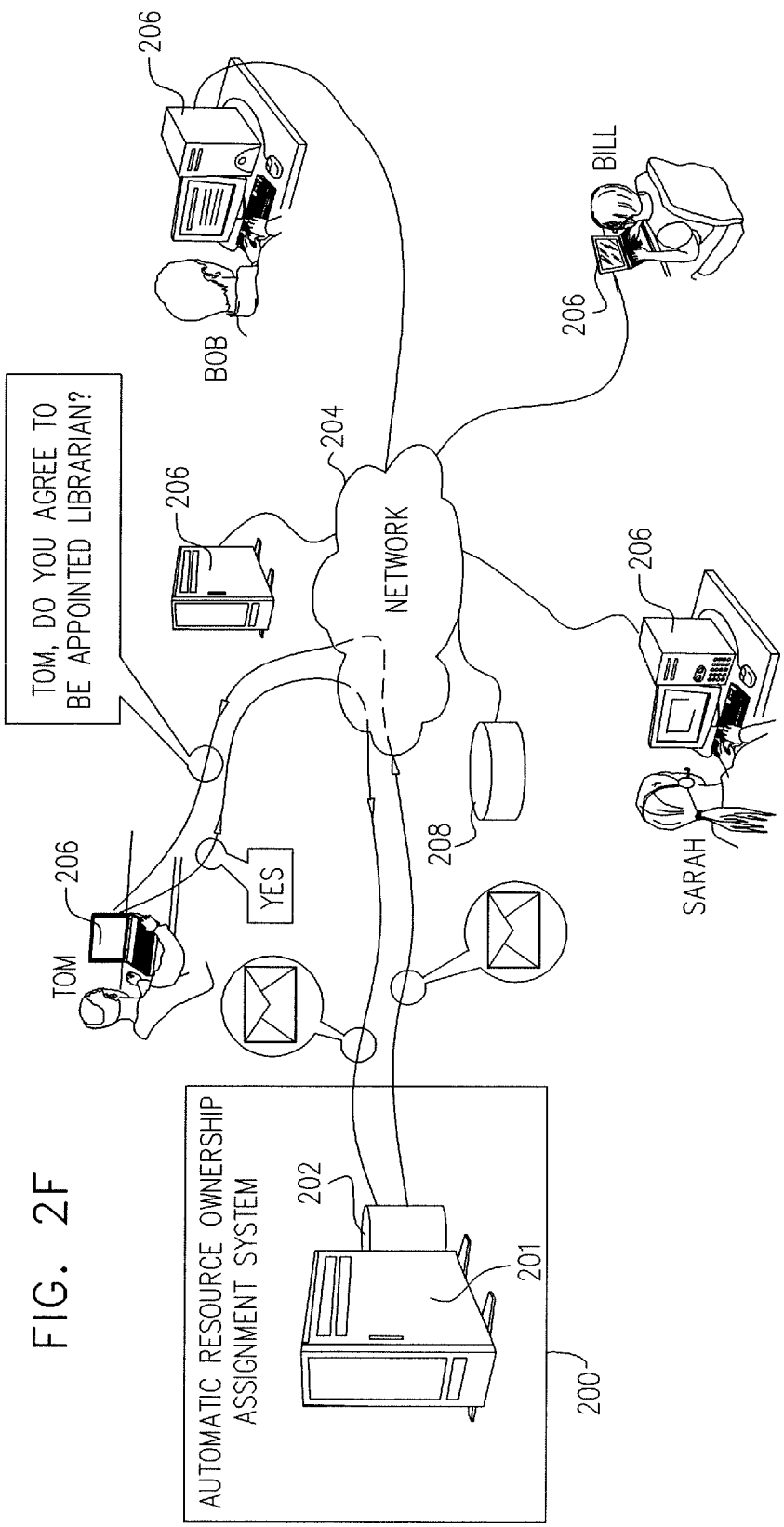

AUTOMATIC RESOURCE OWNERSHIP ASSIGNMENT SYSTEMS AND METHODS

REFERENCE TO RELATED APPLICATIONS

Reference is made to U.S. patent application Ser. No. 12/673,691, filed Feb. 16, 2010, and entitled "ENTERPRISE LEVEL DATA MANAGEMENT", which is a National Phase Application of PCT\IL2010\000069 filed Jan. 27, 2010 and entitled "ENTERPRISE LEVEL DATA MANAGEMENT", the disclosure of which is hereby incorporated by reference and priority of which is hereby claimed pursuant to 37 CFR 1.78(a) (1) and (2)(i).

Reference is also made to the following patents and patent applications, owned by assignee, the disclosures of which are hereby incorporated by reference:

U.S. Pat. Nos. 7,555,482 and 7,606,801;

U.S. Published Patent Application Nos. 2007/0244899, 2008/0271157, 2009/0100058, 2009/0119298 and 2009/0265780; and U.S. patent application Ser. Nos. 12/772,450 and 12/814,807.

FIELD OF THE INVENTION

The present invention relates to automatic resource ownership assignment systems and methods.

BACKGROUND OF THE INVENTION

The following patent publications are believed to represent the current state of the art:

U.S. Pat. Nos. 5,465,387; 5,899,991; 6,338,082; 6,393,468; 6,928,439; 7,031,984; 7,068,592; 7,403,925; 7,421,740; 7,555,482, 7,606,801 and 7,743,420; and U.S. Published Patent Application Nos.: 2003/0051026; 2004/0249847; 2005/0108206; 2005/0203881; 2005/0086529; 2006/0064313; 2006/0184530; 2006/0184459; 2007/0203872; 2007/0244899; 2008/0271157; 2009/0100058; 2009/0119298 and 2009/0265780.

SUMMARY OF THE INVENTION

The present invention provides improved systems and methodologies for automatic resource ownership assignment.

There is thus provided in accordance with a preferred embodiment of the present invention an automatic resource ownership assignment system, the system including resource ownership indicators definition functionality operative to allow an operator of the system to define resource ownership indicators, automatic resource ownership recommendation functionality operative to provide, to at least one user of the system, a recommendation to assign ownership of at least one resource to a potential owner, based on the resource ownership indicators, and automatic resource ownership assignment functionality which, responsive to predetermined at least partial approval of the at least one recommendation by the at least one user and approval of the at least one recommendation by the potential owner, is operative to automatically assign ownership of the at least one resource to the potential owner.

The term "predetermined at least partial approval" is used throughout to mean approval of a recommendation by a single user is a case where approval of the recommendation is requested from the single user, or approval of the recommendation by a predetermined portion of users in a case where approval of the recommendation is requested from multiple users.

In accordance with a preferred embodiment of the present invention, the ownership of at least one resource includes responsibility for managing access permissions to the resource.

There is also provided in accordance with another preferred embodiment of the present invention an automatic folder ownership assignment system, the system including folder ownership indicators definition functionality operative to allow an administrator of the system to define folder ownership indicators, automatic folder ownership recommendation functionality operative to provide, to at least one user of the system, a recommendation to assign ownership of at least one folder to a potential owner, based on the folder ownership indicators, and automatic folder ownership assignment functionality which, responsive to predetermined at least partial approval of the at least one recommendation by the at least one user and approval of the at least one recommendation by the potential owner, is operative to assign ownership of the at least one folder to the potential owner.

In accordance with a preferred embodiment of the present invention, the ownership of at least one folder includes responsibility for managing access permissions to the folder. Preferably, the access permissions include at least one of read permissions to at least one file within the folder, write permissions to at least one file within the folder, permissions to create at least one file in the folder and permissions to delete at least one file in the folder.

Additionally, managing access permissions to the folder is achieved by at least one of manually setting user access permissions to the folder, and configuring automatic rules for setting user access permissions to the folder.

Preferably, the system resides on a computer server. Preferably, the computer server is connected to an enterprise level network. Preferably, the system includes a database. Preferably, the database includes access permissions information for at least some of the folders in the network. Preferably, the database includes actual access history information for at least some of the folders in the network. Preferably, the database includes metadata relating to at least some of the folders in the network. Preferably, the metadata includes at least one of creation date and size.

Preferably, the database also includes folder ownership information for all folders in the network. Preferably, the folder ownership indicators include at least one of actual access to the at least one folder, access permissions to the at least one folder and the identity of a creator of the at least one folder.

Additionally, the automatic folder ownership assignment functionality, responsive to rejection of the at least one recommendation by the at least one user or by the potential owner, and responsive to receiving an alternative recommendation from the at least one user or from the potential owner to assign ownership of the at least one folder to an alternative owner, is operative to automatically assign ownership of the at least one folder to the alternative owner.

The term "rejection" is used throughout to mean rejection of a recommendation by a single user is a case where approval of the recommendation is requested from the single user, or rejection of the recommendation by a predetermined portion of users in a case where approval of the recommendation is requested from multiple users.

There is further provided in accordance with yet another preferred embodiment of the present invention an automatic library ownership assignment system, the system including library ownership indicators definition functionality operative to allow an operator of the system to define library ownership indicators, automatic library ownership recommendation functionality operative to provide, to at least one user of a library, a recommendation to assign ownership of the library to a potential owner, based on the library ownership indicators, and automatic library ownership assignment functionality which, responsive to predetermined at least partial approval of the at least one recommendation by the at least one user and approval of the at least one recommendation by the potential owner, is operative to automatically assign ownership of the library to the potential owner.

There is yet further provided in accordance with still another preferred embodiment of the present invention a method for automatic resource ownership assignment, the method including defining resource ownership indicators, automatically providing, to at least one individual, a recommendation to assign ownership of at least one resource to a potential owner, based on the resource ownership indicators, and responsive to predetermined at least partial approval of the at least one recommendation by the at least one individual and approval of the at least one recommendation by the potential owner, to automatically assign ownership of the at least one resource to the potential owner.

In accordance with a preferred embodiment of the present invention, the ownership of at least one resource includes responsibility for managing access permissions to the resource.

There is also provided in accordance with another preferred embodiment of the present invention a method for automatic folder ownership assignment, the method including defining folder ownership indicators, automatically providing, to at least one individual, a recommendation to assign ownership of at least one folder to a potential owner, based on the folder ownership indicators, and responsive to predetermined at least partial approval of the at least one recommendation by the at least one individual and approval of the at least one recommendation by the potential owner, to automatically assign ownership of the at least one folder to the potential owner.

In accordance with a preferred embodiment of the present invention, the ownership of at least one folder includes responsibility for managing access permissions to the folder. Preferably, the access permissions include at least one of read permissions to at least one file within the folder, write permissions to at least one file within the folder, permissions to create at least one file in the folder and permissions to delete at least one file in the folder.

Additionally, managing access permissions to the folder is achieved by at least one of manually setting user access permissions to the folder, and configuring automatic rules for setting user access permissions to the folder. Preferably, the folder ownership indicators include at least one of actual access to the at least one folder, access permissions to the at least one folder and the identity of a creator of the at least one folder.

Additionally, responsive to rejection of the at least one recommendation by the at least one individual or by the potential owner, and responsive to receiving an alternative recommendation from the at least one individual or from the potential owner to assign ownership of the at least one folder to an alternative owner, the method also includes assigning ownership of the at least one folder to the alternative owner.

There is further provided in accordance with yet another preferred embodiment of the present invention a method for automatic library ownership assignment, the method including defining library ownership indicators, automatically providing, to at least one user of a library, a recommendation to assign ownership of the library to a potential owner, based on the library ownership indicators, and responsive to predetermined at least partial approval of the at least one recommendation by the at least one user and approval of the at least one recommendation by the potential owner, to automatically assign ownership of the library to the potential owner.

BRIEF DESCRIPTION OF THE DRAWINGS

The present invention will be understood and appreciated more fully from the following detailed description, taken in conjunction with the drawings in which:

FIGS. 1A, 1B, 1C, 1D, 1E, 1F and 1G are simplified pictorial illustrations of the operation of an automatic folder ownership assignment system, constructed and operative in accordance with a preferred embodiment of the present invention; and FIGS. 2A, 2B, 2C, 2D, 2E, 2F and 2G are simplified pictorial illustrations of the operation of an automatic resource ownership assignment system, constructed and operative in accordance with a preferred embodiment of the present invention.

DETAILED DESCRIPTION OF PREFERRED EMBODIMENTS

Reference is now made to FIGS. 1A, 1B, 1C, 1D, 1E, 1F and 1G, which are simplified pictorial illustrations of the operation of an automatic folder ownership assignment system, constructed and operative in accordance with a preferred embodiment of the present invention.

The term "ownership" is used throughout to designate authority and accountability within an enterprise as distinct to legal ownership in the normal sense of the word. "Ownership" of a data element, an organization function, a resource, whether IT related or not, a service, a workflow or any other element in an enterprise designates authority and accountability with respect thereto within the enterprise. The definitions of "owner" and "owning" are of corresponding meaning.

The automatic folder ownership assignment system of FIGS. 1A-1G is preferably suitable for operating in an enterprise computer network including multiple disparate clients, data storage elements, computer hardware resources and computer software resources, and includes folder ownership indicators definition functionality (FOIDF) operative to allow an administrator of the system to define folder ownership indicators, automatic folder ownership recommendation functionality (AFORF) operative to provide, to at least one user of the system, a recommendation to assign ownership of at least one folder to a potential owner, based on the folder ownership indicators, and automatic folder ownership assignment functionality (AFOAF) which, responsive to predetermined at least partial approval of the at least one recommendation by the at least one user and approval of the at least one recommendation by the potential owner, is operative to assign ownership of the at least one folder to the potential owner.

The term "predetermined at least partial approval" is used throughout to mean approval of a recommendation by a single user is a case where approval of the recommendation is requested from the single user, or approval of the recommendation by a predetermined portion of users in a case where approval of the recommendation is requested from multiple users.

The term "rejection" is used throughout to mean rejection of the recommendation by a single user is a case where approval of the recommendation is requested from the single user, or rejection of the recommendation by a predetermined portion of users in a case where approval of the recommendation is requested from multiple users.

The owner of a folder is responsible, for example, for managing access permissions to the folder. Such access permissions may include read or write permissions to a file within the folder, and modification permissions to a folder (e.g. permissions to create or delete files). Management of access permissions by the owner may be achieved, for example, by manually setting user access permissions to the folder, and by configuring automatic rules for setting user access permissions to the folder.

Figure 1A:
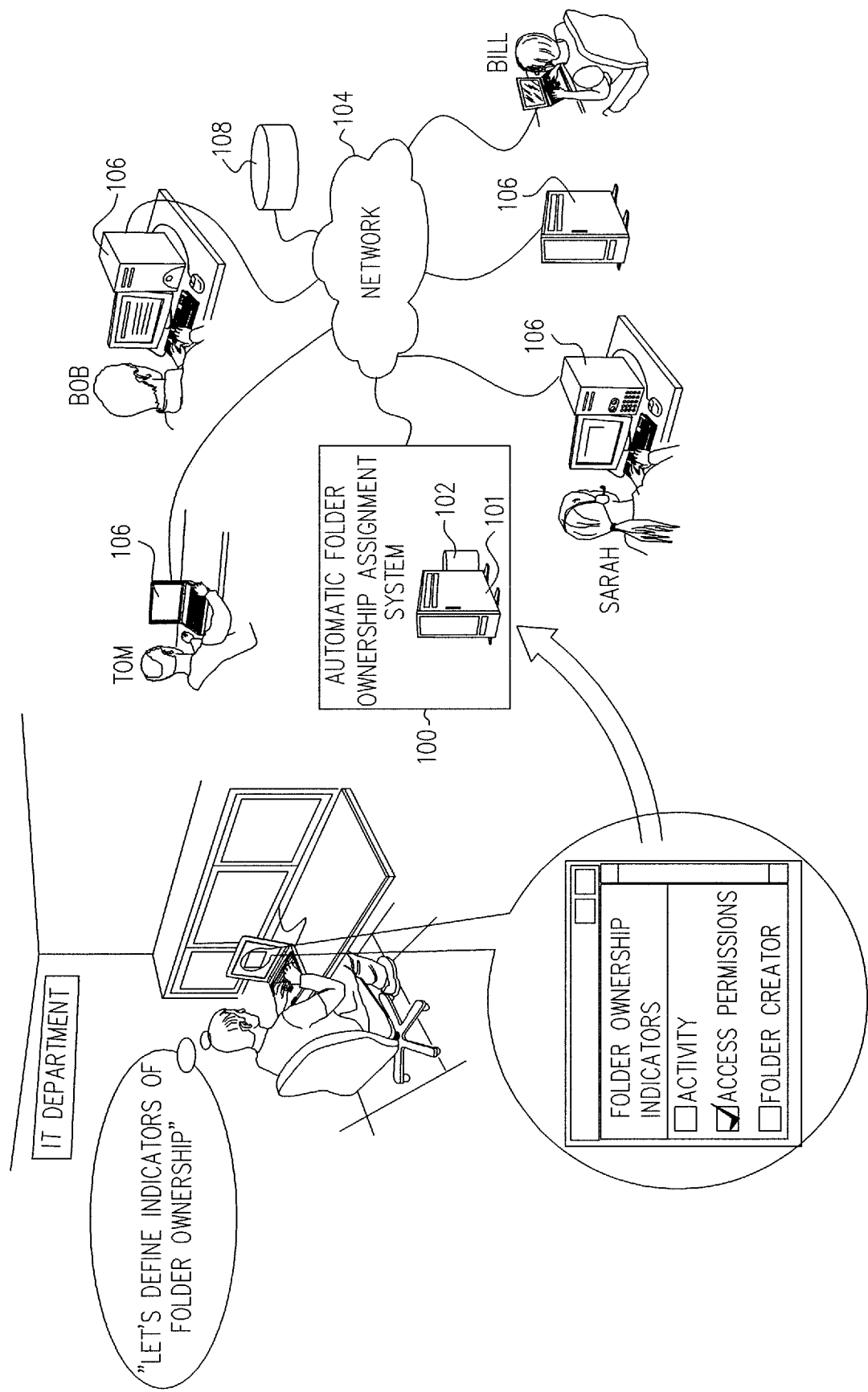

As shown in FIG. 1A, the automatic folder ownership assignment system 100 preferably resides on a computer server 101, and preferably includes a database 102. Server 101 is preferably connected to an enterprise level network 104 to which may be connected hundreds or thousands of computers 106 and storage devices 108. Database 102 preferably stores user access permissions and actual access history for all folders stored across network 104 as well as a list of the owner of each of the folders, and other metadata relating to the folders, such as creation date and size.

As also shown in FIG. 1A, a user of the automatic folder ownership assignment system, typically an administrator of computer network 104, utilizes the system to define indicators of folder ownership across network 104. Indicators of ownership of a particular folder may include, for example, extensive user activity in the folder by a particular individual, extensive access permissions of a particular individual to the folder, and the identity of the creator of the folder. As shown in FIG. 1A, the administrator chooses to define extensive access permissions as the indicator of folder ownership across network 104.

Figure 1C:
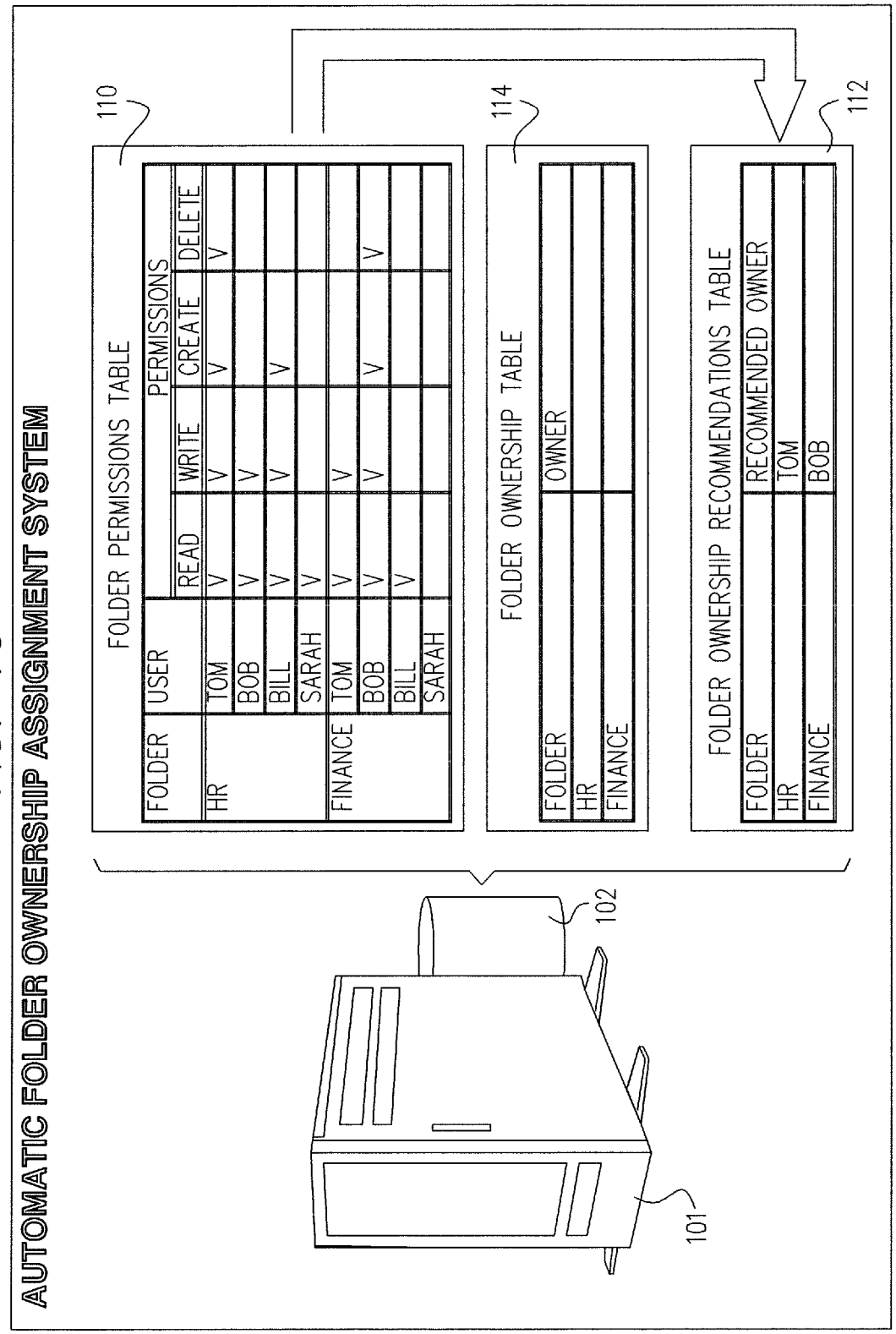

Turning now to FIG. 1B, it is shown that the administrator of network 104 further uses the system to automatically assign owners to folders across network 104. As seen in FIG. 1B, the administrator chooses to automatically assign owners to the HR folder and to the Finance folder which both reside in one of the data storage elements connected to network 104. As seen in FIG. 1C, based on the administrator defining extensive access permissions to be the indicator of folder ownership, the system utilizes a folder permissions table 110 which is part of database 102 to formulate recommendations for ownership of the HR folder and the Finance folder, which are entered into a folder ownership recommendations table 112. As shown in FIG. 1C, the system recommends that Tom, who has extensive access permissions to the HR folder, which extensive access permissions include read, write, create and delete permissions, be assigned ownership of the HR folder. The system also recommends that Bob, who has extensive access permissions to the Finance folder, which extensive access permissions include read, write, create and delete permissions, be assigned ownership of the Finance folder.

Figure 1E:
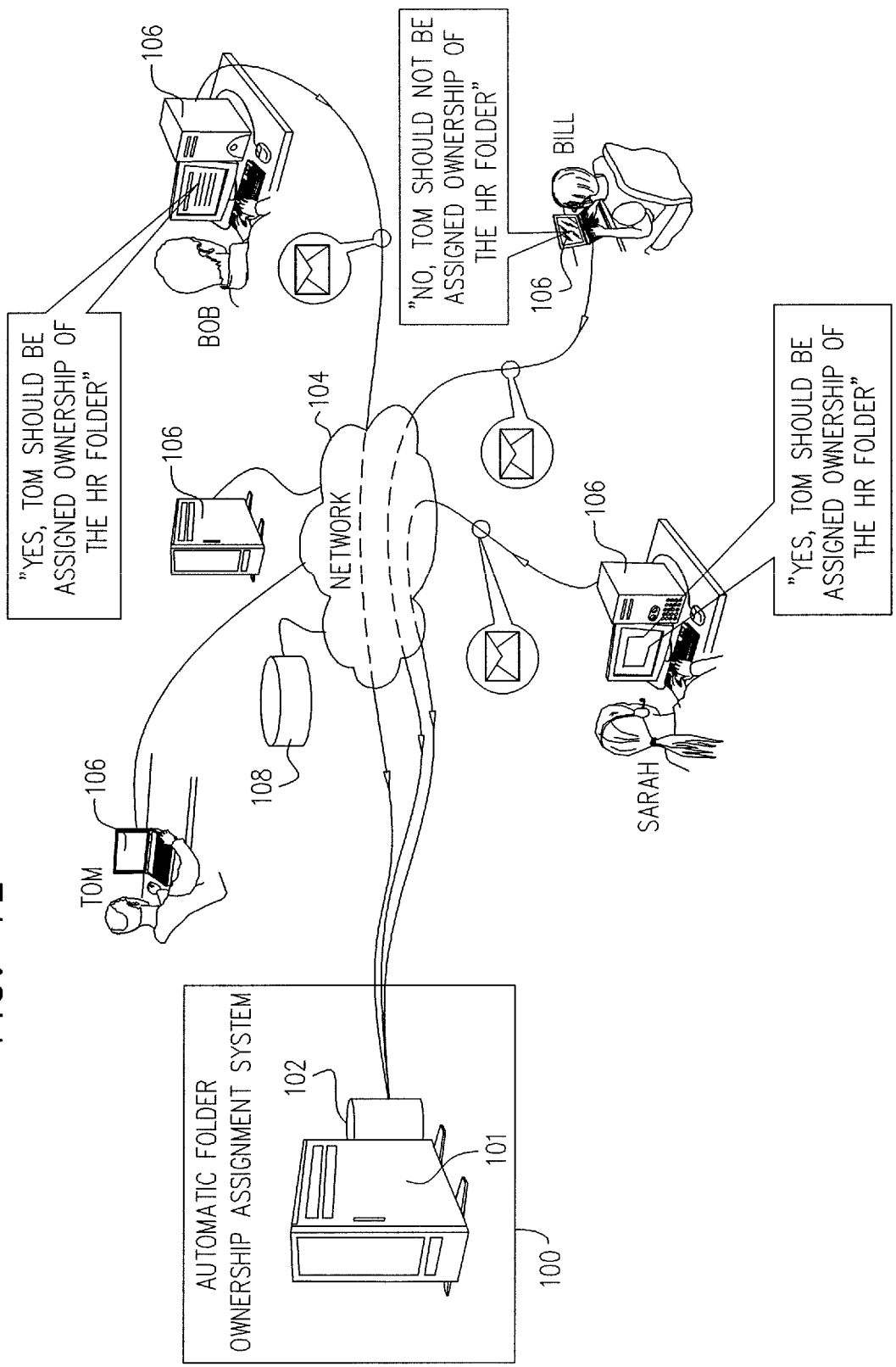

The system then requests predetermined at least partial approval of the folder ownership recommendation for the HR folder from at least some of the users having access permissions to the HR folder, typically from users who are most active in accessing the HR folder. As seen in FIG. 1D, the system requests approval of the folder ownership recommendation from Bob, Bill and Sarah. As shown in FIG. 1E, Bob and Sarah approve the recommendation, and Bill does not approve the recommendation. In alternative embodiments of the present invention, a user who does not approve a recommendation may propose an alternative folder ownership recommendation.

Figure 1F:
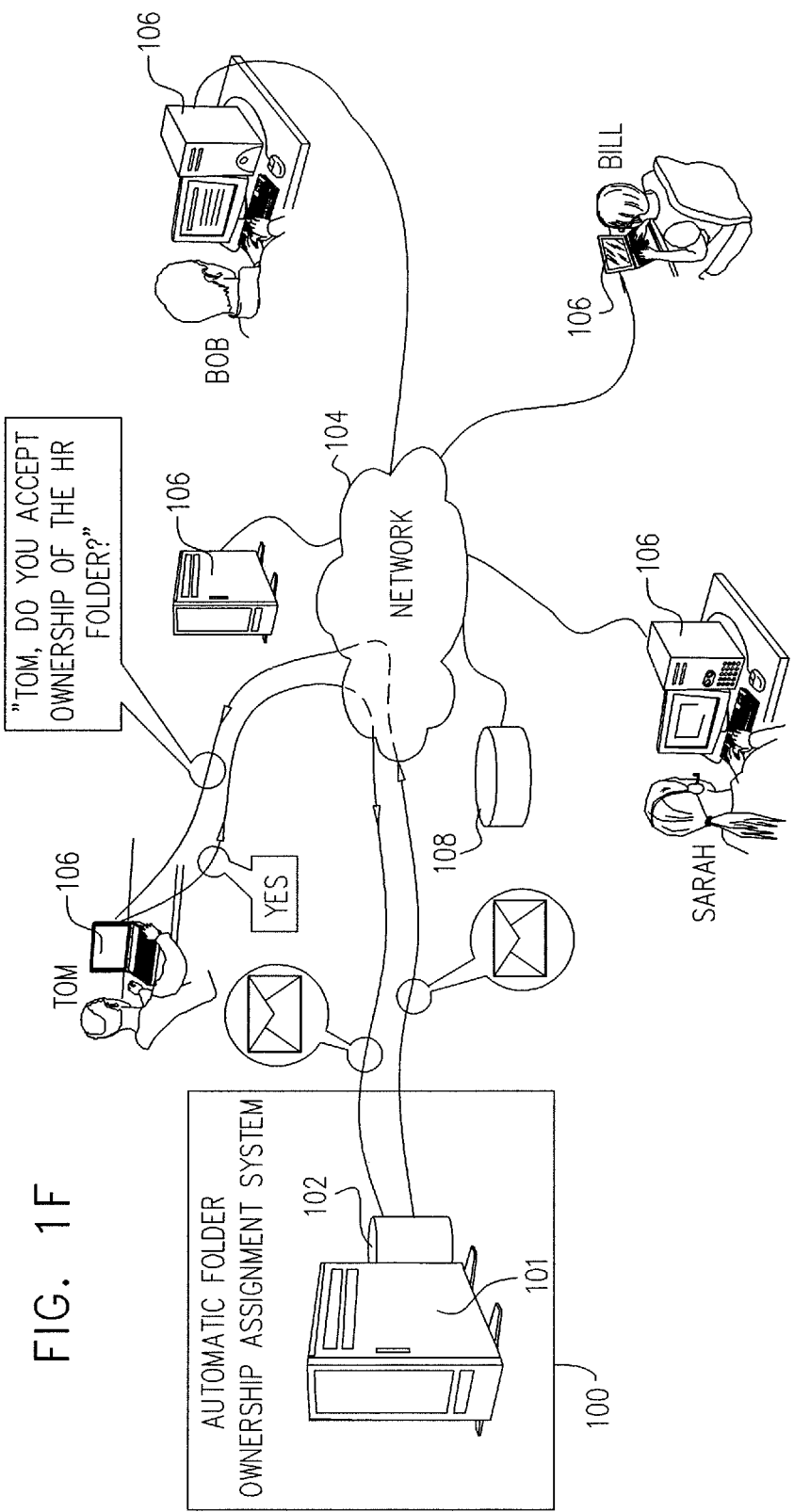

As shown in FIG. 1F, after ascertaining that the majority of users from whom the system requested approval of the folder ownership recommendation for the HR folder approve the recommendation to assign ownership of the HR folder to Tom, the system then requests approval of the ownership recommendation from Tom, asking Tom if he accepts ownership of the HR folder.

Upon receiving the approval of the ownership recommendation from Tom, the system assigns ownership of the HR folder to Tom, as shown in FIG. 1G. Similarly, the system assigns ownership of the Finance folder to Bob. Ownership of the folders is recorded in a folder ownership table 114 of database 102.

Reference is now made to FIGS. 2A, 2B, 2C, 2D, 2E, 2F and 2G, which are simplified pictorial illustrations of the operation of an automatic resource ownership assignment system, constructed and operative in accordance with a preferred embodiment of the present invention.

The automatic resource ownership assignment system of FIGS. 2A-2G is preferably suitable for operating in an organization comprising a plurality of organizational resources, each of which need to managed by a responsible individual. One such resource may be, for example, a library having a plurality of registered borrowers which are authorized to borrow items such as books, periodicals and other publications from the library for a limited amount of time. The owner of the library is responsible, for example, for managing the process of borrowing and returning books to the library, and setting, implementing and enforcing policies regarding book loan eligibility and duration.

Referring now specifically to FIG. 2A, there is shown an automatic ownership assignment system 200 which preferably resides on a computer server 201, and preferably includes a database 202. Server 201 is preferably connected to a computer network 204 to which may be connected hundreds or thousands of computers 206 and storage devices 208. Database 202 preferably stores a list of owners of each of the resources, and other data relating to the resources, such as library access rights of all members of a library.

As shown in FIG. 2A, a user of the automatic resource ownership assignment system, typically an organizational administrator utilizes the system to define indicators of potential library ownership. Indicators of potential ownership of a library may include, for example, extensive activity in the library by a particular individual, extensive access rights of a particular individual to the library, and the contribution of a particular individual to the content of the library. As shown in FIG. 2A, the administrator chooses to define extensive access rights as the indicator of potential library ownership.

Turning now to FIG. 2B, it is shown that the organizational administrator further uses the system to automatically appoint a librarian for the library. As seen in FIG. 2C, based on the administrator defining extensive access rights to be the indicator of library ownership, the system utilizes a library access rights table 210 which is part of database 202 to formulate a recommendation for ownership of the library, which is entered into a resource ownership recommendations table 212. As shown in FIG. 2C, the system recommends that Tom, who has extensive access rights to the library, which extensive access rights include access, and borrowing rights for both the books section and the periodicals section of the library, be assigned ownership of the library.

Figure 2D:
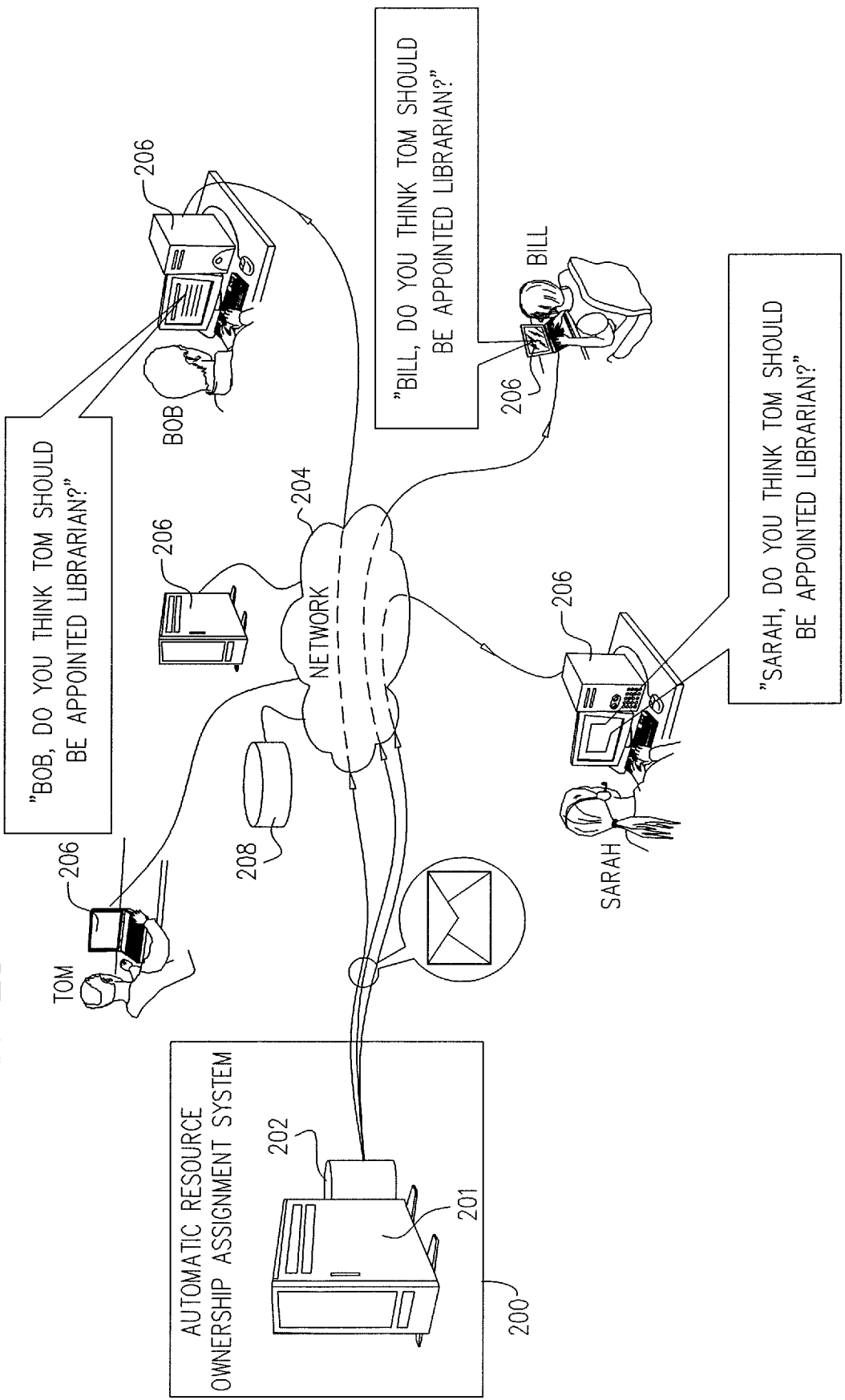
Figure 2E:
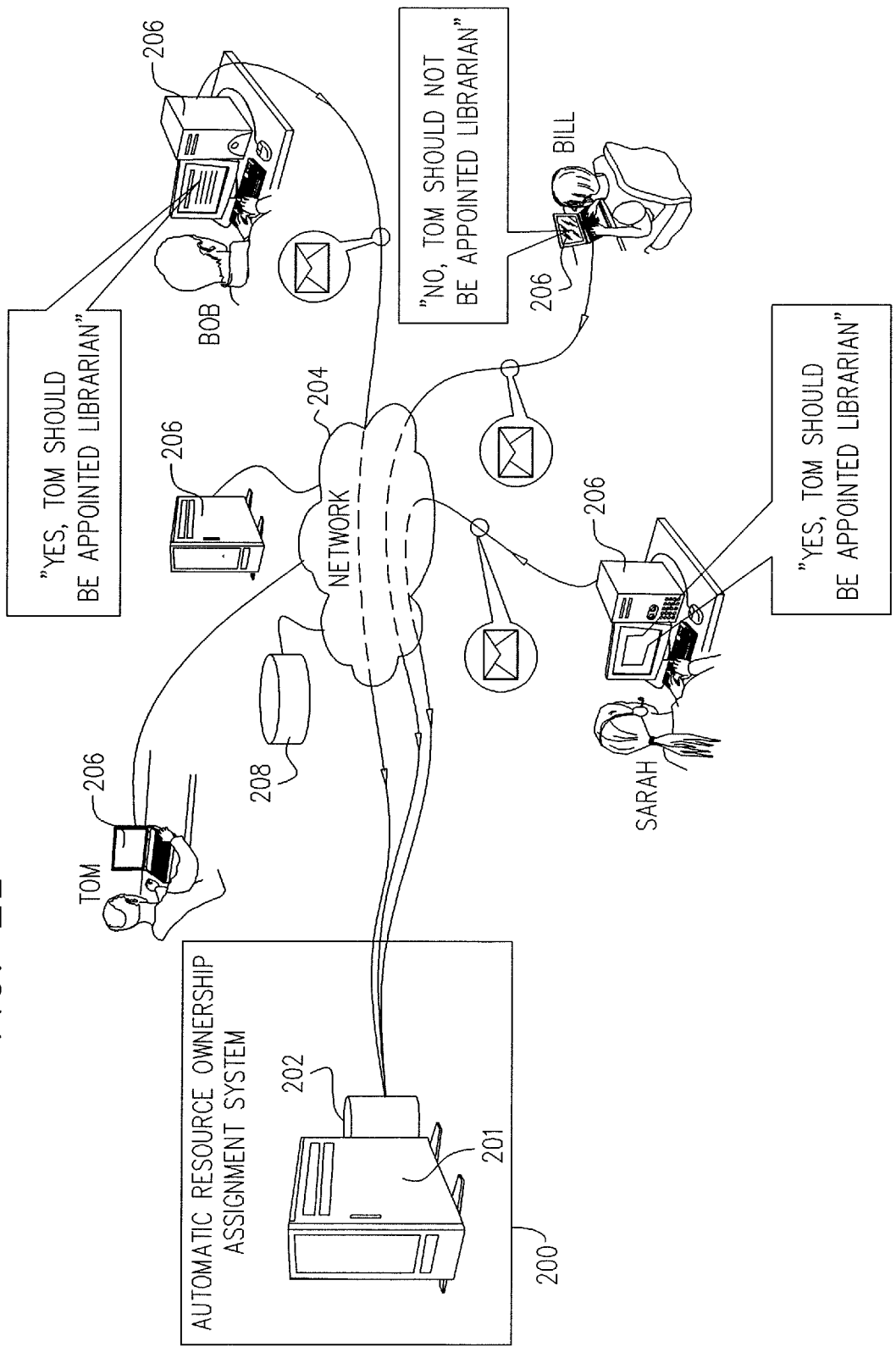

The system then requests predetermined at least partial approval of the library ownership recommendation from at least some of the users having access rights to the library, typically from users who are most active in accessing the library. As seen in FIG. 2D, the system requests approval of the library ownership recommendation from Bob, Bill and Sarah. As shown in FIG. 2E, Bob and Sarah approve the recommendation, and Bill does not approve the recommendation. In alternative embodiments of the present invention, a user who does not approve a recommendation may propose an alternative library ownership recommendation.

As shown in FIG. 2F, after ascertaining that the majority of users from whom the system requested approval of the library ownership recommendation approve the recommendation to assign ownership of the library to Tom, the system then requests approval of the ownership recommendation from Tom, asking Tom if he accepts ownership of the library.

Figure 2G:
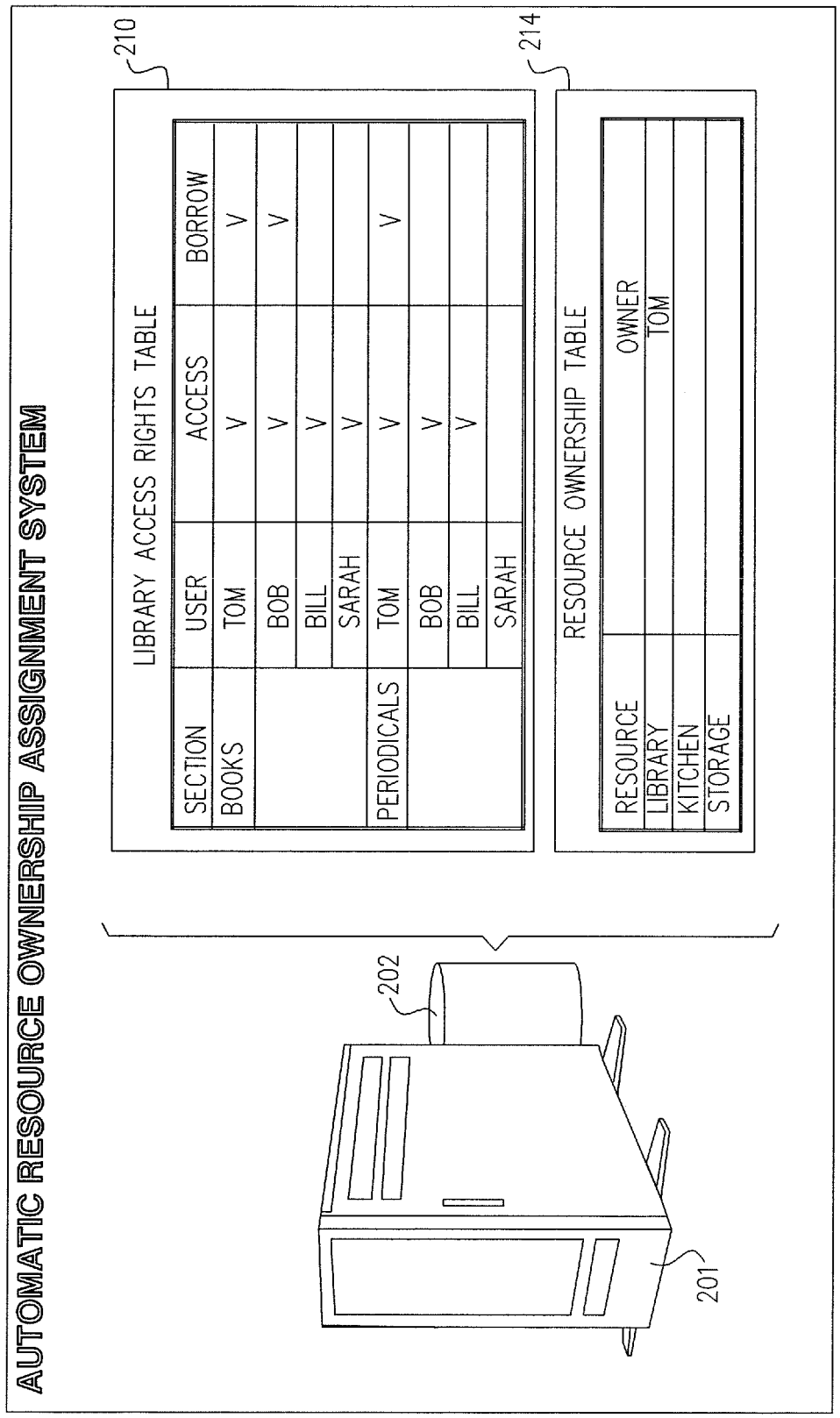

Upon receiving the approval of the ownership recommendation from Tom, the system assigns ownership of the library to Tom, as shown in FIG. 2G. Ownership of the library is recorded in a resource ownership table 214 of database 202.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. An automatic resource ownership assignment system residing on a computer server and including a database, said system forming part of an enterprise computer network, said database containing actual access history information for at least some resources of said enterprise computer network, said system comprising at least one processor and a non-transitory tangible computer-readable medium in which computer program instructions are stored, which instructions, when read by a computer, cause the computer to provide the following functionalities:
   resource ownership indicators definition functionality operative to allow an operator of said system to define resource ownership indicators for at least one enterprise computer network resource, said resource ownership indicators including extensive user activity by a user in said at least one enterprise computer network resource and access permissions of a user to the at least one enterprise computer network resource and at least one of actual access to at least one enterprise computer network resource, access permissions to said at least one enterprise computer network resource and an identity of a creator of said at least one enterprise computer network resource;
   automatic resource ownership recommendation functionality operative:
      to provide, to at least some users of said at least one enterprise computer network resource, a recommendation to assign ownership of said at least one enterprise computer network resource to a potential owner, based on said resource ownership indicators; and
      to request approval of said potential owner of said recommendation to assign ownership from said at least some users; and
   automatic resource ownership assignment functionality which, responsive to approval of said recommendation to assign ownership by a majority of said at least some users, is operative:
      to request approval of said potential owner of said recommendation to assign ownership from said potential owner; and
      upon receiving approval of said recommendation from said potential owner, to automatically assign ownership of said at least one enterprise computer network resource to said potential owner, said ownership of said at least one enterprise computer network resource comprising responsibility for managing access permissions to said at least one enterprise computer network resource.

2. An automatic folder ownership assignment system residing on a computer server and including a database, said system forming part of an enterprise computer network, said database containing actual access history information for at least some folders of said enterprise computer network, said system comprising at least one processor and a non-transitory tangible computer-readable medium in which computer program instructions are stored, which instructions, when read by a computer, cause the computer to provide the following functionalities:
   folder ownership indicators definition functionality operative to allow an administrator of said system to define folder ownership indicators for at least one enterprise computer network folder said folder ownership indicators including extensive user activity by a user in said at least one enterprise computer network folder and access permissions of a user to the at least one enterprise computer network folder and at least one of actual access to at least one enterprise computer network folder, access permissions to said at least one enterprise computer network folder and an identity of a creator of said at least one enterprise computer network folder;
   automatic folder ownership recommendation functionality operative:
      to provide, to at least some users of said at least one enterprise computer network folder, a recommendation to assign ownership of said at least one enterprise computer network folder to a potential owner, based on said folder ownership indicators; and
      to request approval of said potential owner of said recommendation to assign ownership from said at least some users; and
   automatic resource ownership assignment functionality which, responsive to approval of said recommendation to assign ownership by a majority of said at least some users, is operative:
      to request approval of said potential owner of said recommendation to assign ownership from said potential owner; and
      upon receiving approval of said recommendation from said potential owner, to assign ownership of said at least one enterprise computer network folder to said potential owner, said ownership of said at least one enterprise computer network folder comprising responsibility for managing access permissions to said at least one enterprise computer network folder.

3. The automatic folder ownership assignment system according to claim 2 and wherein said access permissions comprise at least one of:

read permissions to at least one file within said enterprise computer network folder;
write permissions to at least one file within said enterprise computer network folder;
permissions to create at least one file in said enterprise computer network folder; and
permissions to delete at least one file in said enterprise computer network folder.

4. The automatic folder ownership assignment system according to claim 2 and wherein said managing access permissions to said enterprise computer network folder is achieved by at least one of manually setting user access permissions to said enterprise computer network folder and configuring automatic rules for setting user access permissions to said enterprise computer network folder.

5. The automatic folder ownership assignment system according to claim 2 and wherein said database comprises metadata relating to at least some of the enterprise computer network folders.

6. The automatic folder ownership assignment system according to claim 5 and wherein said metadata comprises at least one of creation date and size.

7. The automatic folder ownership assignment system according to claim 2 and wherein said database also comprises folder ownership information for all of said enterprise computer network folders.

8. An automatic library ownership assignment system residing on a computer server and including a database, said system forming part of an enterprise computer network, said database containing actual access history information for at least one library of said enterprise computer network, said system comprising at least one processor and a non-transitory tangible computer-readable medium in which computer program instructions are stored, which instructions, when read by a computer, cause the computer to provide the following functionalities:
library ownership indicators definition functionality operative to allow an operator of said system to define library ownership indicators for an enterprise library, said library ownership indicators including extensive user activity by a user in said enterprise library and access rights of a user to the enterprise library and at least one of actual access to at least one enterprise computer network library, access permissions to said at least one enterprise computer network library and an identity of a creator of said at least one enterprise computer network library;
automatic library ownership recommendation functionality operative:
to provide, to at least some users of said enterprise library, a recommendation to assign ownership of said enterprise library to a potential owner, based on said library ownership from said at least some users; and
to request approval of said potential owner of said recommendation to assign ownership from said at least some users; and
automatic library ownership assignment functionality which, responsive to approval of said recommendation to assign ownership by a majority of said at least some users, is operative:
to request approval of said potential owner of said recommendation to assign ownership from said potential owner; and
upon receiving approval of said recommendation from said potential owner, to automatically assign ownership of said enterprise library to said potential owner, said ownership of said enterprise library comprising responsibility for managing access permissions to said enterprise library.

9. A method for automatic enterprise computer network resource ownership assignment, said method comprising using at least one server comprising at least one processor and a non-transitory tangible computer-readable medium in which computer program instructions are stored, said non-transitory tangible computer-readable medium containing actual access history information for at least some resources of said enterprise computer network, for:
defining resource ownership indicators for at least one enterprise computer network resource, said resource ownership indicators including extensive user activity by a user in said at least one enterprise computer network resource and access permissions of a user to the at least one enterprise computer network resource and at least one of actual access to at least one enterprise computer network resource, access permissions to said at least one enterprise computer network resource and an identity of a creator of said at least one enterprise computer network resource;
automatically providing, to at least some users of said at least one enterprise computer network resource, a recommendation to assign ownership of said at least one enterprise computer network resource to a potential owner, based on said resource ownership indicators and requesting approval of said potential owner of said recommendation to assign ownership from said at least some users;
responsive to approval of said recommendation by a majority of said at least some users, requesting approval of said potential owner of said recommendation to assign ownership from said potential owner; and
responsive to approval of said recommendation by said potential owner, automatically assigning ownership of said at least one enterprise computer network resource to said potential owner, said ownership of said at least one enterprise computer network resource comprising responsibility for managing access permissions to said at least one enterprise computer network resource.

10. A method for automatic enterprise computer network folder ownership assignment, said method comprising using at least one server comprising at least one processor and a non-transitory tangible computer-readable medium in which computer program instructions are stored, said non-transitory tangible computer-readable medium containing actual access history information for at least some folders of said enterprise computer network, for:
defining folder ownership indicators for at least one enterprise computer network folder, said selectable folder ownership indicators including extensive user activity by a user in said at least one enterprise computer network folder and access permissions of a user to the at least one enterprise computer network folder and at least one of actual access to at least one enterprise computer network folder, access permissions to said at least one enterprise computer network folder and an identity of a creator of said at least one enterprise computer network folder;
automatically providing, to at least some users of said at least one enterprise computer network folder, a recommendation to assign ownership of said at least one enterprise computer network folder to a potential owner, based on said folder ownership indicators and requesting approval of said potential owner of said recommendation to assign ownership from said at least some users;

responsive to approval of said recommendation by a majority of said at least some users, requesting approval of said potential owner of said recommendation to assign ownership from said potential owner; and responsive to approval of said recommendation by said potential owner, automatically assigning ownership of said at least one enterprise computer network folder to said potential owner, said ownership of said at least one enterprise computer network folder comprising responsibility for managing access permissions to said at least one enterprise computer network folder.

11. The method for automatic folder ownership assignment according to claim 10 and wherein said access permissions comprise at least one of:

read permissions to at least one file within said enterprise computer network folder;

write permissions to at least one file within said enterprise computer network folder;

permissions to create at least one file in said enterprise computer network folder; and permissions to delete at least one file in said enterprise computer network folder.

12. The method for automatic folder ownership assignment according to claim 10 and wherein said managing access permissions to said enterprise computer network folder is achieved by at least one of manually setting user access permissions to said enterprise computer network folder, and configuring automatic rules for setting user access permissions to said enterprise computer network folder.

13. A method for automatic enterprise computer network library ownership assignment, said method comprising using at least one server comprising at least one processor and a non-transitory tangible computer-readable medium in which computer program instructions are stored, said non-transitory tangible computer-readable medium containing actual access history information for at least some libraries of said enterprise computer network, for:

defining library ownership indicators for an enterprise library, said library ownership indicators including extensive user activity by a user in said enterprise library and access rights of a user to the enterprise library and at least one of actual access to at least one enterprise computer network library, access permissions to said at least one enterprise computer network library and an identity of a creator of said at least one enterprise computer network library;

automatically providing, to at least some users of said enterprise library, a recommendation to assign ownership of said enterprise library to a potential owner, based on said library ownership indicators and requesting approval of said potential owner of said recommendation to assign ownership from said at least some users;

responsive to approval of said recommendation by a majority of said at least some users, requesting approval of said potential owner of said recommendation to assign ownership from said potential owner; and responsive to approval of said recommendation by said potential owner, automatically assigning ownership of said enterprise library to said potential owner, said ownership of said enterprise library comprising responsibility for managing access permissions to said enterprise library.

* * * * *